United States Patent [19]

Kilduff

[11] 3,751,301
[45] Aug. 7, 1973

[54] RESERVE BATTERY ELECTRODES USING BONDED ACTIVE MATERIALS

[75] Inventor: Timothy J. Kilduff, Greenbelt, Md.

[73] Assignee: The United States of America as represented by the Secretary of the Army, Washington, D.C.

[22] Filed: July 13, 1970

[21] Appl. No.: 54,273

Related U.S. Application Data

[63] Continuation-in-part of Ser. No. 847,906, Aug. 6, 1969, Pat. No. 3,629,007.

[52] U.S. Cl. .................................................. 136/26
[51] Int. Cl. .......................................... H01m 39/00
[58] Field of Search ............... 136/26, 27, 36, 37, 136/46, 49, 56, 57, 64, 75, 120; 117/216, 217, 218, 227, 230, 232, 127, 128.4

[56] References Cited
UNITED STATES PATENTS

| 3,447,969 | 6/1969 | Tudor et al. | 136/26 |
| 3,438,817 | 4/1969 | Short et al. | 136/120 |
| 3,318,794 | 5/1967 | Kiyohara et al. | 136/27 |
| 3,486,940 | 12/1969 | Ruben | 136/26 |
| 3,496,020 | 2/1970 | Jackson et al. | 136/27 |
| 3,518,120 | 6/1970 | Lello et al. | 136/26 |
| 2,781,277 | 2/1957 | Dwyer | 117/216 |
| 2,737,541 | 3/1956 | Coolidge | 136/26 |
| 2,677,713 | 5/1954 | Weil et al. | 136/26 |
| 3,208,881 | 9/1965 | Fullon | 136/26 |
| 3,629,007 | 12/1971 | Kilduff | 136/27 |

*Primary Examiner*—Winston A. Douglas
*Assistant Examiner*—C. F. Lefevour
*Attorney*—Harry M. Saravovitz, Edward J. Kelly, Herbert Berl and Saul Elbaum

[57] ABSTRACT

Reserve battery electrodes and a method for preparing said electrodes wherein a metal support body is coated with a substantially non-corrodable electrically conductive material and then over-coated with an active material, for example, lead dioxide, dispersed in a resinous binder. The non-corrodible electrically conductive underlayer is applied in an amount sufficient to prevent corroding of the metal support body and sufficient to prevent formation of an interfacial resistance barrier between the metal support body and the subsequently applied coating. The electrically conductive material is applied to the support body in admixture with a thermosetting resin. Alternatively, the metal support body is flash-plated with a metal which is either inert to oxidation when in contact with the active material or forms a conductive oxide in contact with the active material. In the first embodiment, the active material is applied to the first layer in admixture with a thermosetting resin. Activation time can be reduced by applying dry lead-dioxide particles to the surface of the active material.

4 Claims, 2 Drawing Figures

PATENTED AUG 7 1973　　　　　　　　　　3,751,301

INVENTOR,
TIMOTHY J. KILDUFF
BY Harry M. Saragovitz
Edward J. Kelly
Herbert Berl
Saul Elbaum
ATTORNEYS

RESERVE BATTERY ELECTRODES USING BONDED ACTIVE MATERIALS

This application is a continuation-in-part of Ser. No. 847,906 filed Aug. 6, 1969 now U.S. Pat. No. 3,629,007.

BACKGROUND OF THE INVENTION

This invention relates generally to electrodes for use in oxidative acid cell systems for the generation of power or in electrolytic cells, such as for electrolysis of salt solutions. More particularly, this invention relates to an inexpensive widely applicable technique of producing coatings of active materials on electrodes which are characterized by reduced interfacial resistance between the coating and the metal support body and which are capable of reacting with a suitable electrolyte to yield a very high current output over a relatively extended period of time without significant voltage drop.

It is well known that lead dioxide type electrodes are capable of generating a high current output when used with an acid type electrolyte, such as dilute sulfuric acid or fluoroboric acid, and a free lead electrode. According to one system developed by the prior art, lead dioxide type cells were provided wherein a thin film of $\beta$-lead dioxide was electrolytically plated onto a metal body, such as a nickel plated steel shim stock, having an electrolytic coating of lead on its reverse side. A thin film of $\alpha$-lead dioxide was electrolytically plated over the thin $\beta$-lead dioxide film. Although this five-layer configuration provided good cell output with only a slight voltage drop when placed under load, the electrolytic coatings of lead dioxide were generally unsuitable for heavy duty operation in that they tended to chip or peel away from the metallic e'ectrode body when die-cut into battery plates. Chipping or peeling was generally attributed to the fact that lead dioxide forms a hard, brittle, inelastic coating when electrolytically deposited onto a metallic substrate, which is incapable of tenaciously adhering to the metallic body as the metal is subjected to handling and to thermal deformation during the operations of the cell. Moreover, the process of electrolytic coating of lead dioxide is expensive and complicated.

The prior art also developed electrodes that employed lead dioxide coatings in resinous binders, but the interfacial resistance between these coatings and the metal substrate was too high to make them useful.

A need existed, therefore, for a less expensive and more widely applicable technique of applying a lead dioxide coating onto a metal support body than that of electrolytically depositing the lead dioxide onto a metallic shim. Further, a need existed for an adherent, tenacious coating of the lead dioxide on the metallic shim. Finally, a need existed for a low interfacial resistance between the coating of $PbO_2$ and the metal substrate, and hence protection of this substrate from oxidation by $PbO_2$ or corrosion by the battery acid electrolyte.

SUMMARY OF THE INVENTION

Accordingly, it is an object of this invention to provide a technique for applying a coating of lead dioxide or other active material onto an electrode body by a less costly and less complicated procedure than electrolytic deposition.

It is another object of this invention to provide a technique whereby coatings of lead dioxide or other active materials can be tenaciousy bonded to an electrode body so that they are not subject to chipping or peeling as the metallic shim is die-cut or thermally deformed.

A further object of this invention is to provide a technique whereby electrodes of lead dioxide or other active materials can be formed whereby corrosion and oxidation of the underlying metallic substrate, and consequent high interfacial resistance between the active materia' and the metal substrate is eliminated.

Yet another object of this invention is to provide a technique whereby activation time is reduced by applying dry lead dioxide particles to the surface of the active material.

These and other objects have herein been attained by applying to the metallic shim, which typically is a low cost, easily oxidizable ferrous metal, a protective first coating comprising conductive material having high resistance to oxidation and corrosion, or a material whose corrosion products are conductive. Thereafter, a second coating of active electrode material, for example, lead dioxide, is applied onto said first coating, the active material being interspersed in a thermosetting resin. The first coating may consist of particles of conductive material interspersed in a thermosetting resin, the quantity of particulate conductive material being present in an amount sufficient to create a series of electrically conductive paths through which current can be passed from the metallic shim to the electrolyte solution.

The thermosetting resin in the first layer then acts not only to prevent corrosive contact of the metal substrate with the battery acid electrolyte, but also minimizes contact of the conductive metal in the first layer with the corrosive acid.

The active material in the second layer can be lead dioxide, or it can be another metallic oxide, halide, hydride, or sulfide having two or more valence states.

Finally, dry lead dioxide particles are applied to the surface of the active material (the second layer) in order to reduce activation time.

DETAILED DESCRIPTION OF THE INVENTION

Figure 1:
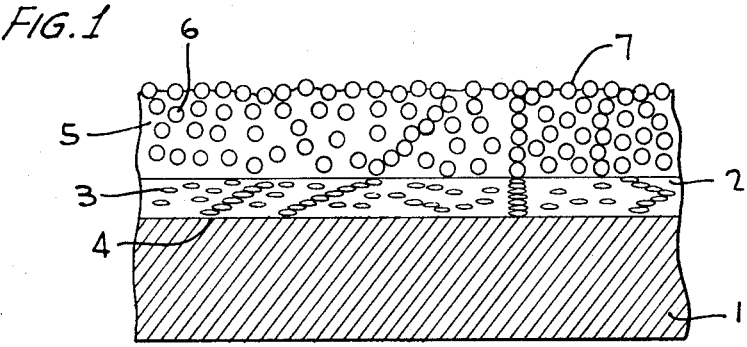
FIG. 1 is a schematic drawing of a metal shim having a first layer of an electrically conductive material in a thermosetting resin matrix, and a second layer of an active material, e.g., lead dioxide, in a thermosetting matrix.

According to the present invention, an electrode is formed by applying a plurality of coatings to a metal shim wherein the first coating comprises a quantity of particulate conductive material interspersed in a thermosetting resin and wherein the second coating comprises a layer of an active material in an amount sufficient to react with a suitable electrolyte in an electrolytic cell. A third coating of dry lead dioxide particles may be applied to the surface of the second coating in order to reduce activation time.

The Conductive Coating

The problem of interfacial electrical resistance, which has plagued the prior art in attempting to use resinous coatings of lead dioxide, has now been avoided by using a conductive thermosetting resin coating which is applied to the metallic shim prior to the lead dioxide coating. This coating contains a sufficient quantity of conductive material so that a series of electrically conductive paths are created between the upper and lower surfaces of the coating which allows the free flow of electrons through the coating without substantial resistance.

The cured thermosetting resin in this layer acts not only to protect a portion of the conductive particles in the coating from coming into immediate contact with the acid-electrolyte, but also prevents the lead dioxide in the succeeding layer from contacting and oxidizing the underlying metallic substrate.

In forming the conductive particulate-resin layer, it is convenient to add the conductive particles to the uncured resin, coat the uncured resin-conductive particle mixture onto the base, and thereafter cure the resin so as to form a highly tenacious bond between the resin and the base. While good electrical results are obtainable in using conductive metallic flakes, such as the noble metals, including silver, gold, platinum, rubidium and the like, equally good results have been obtained when using particles of such non-metallic but conductive materials as carbon and graphite. Silver has been found to be quite acceptable, although it is very easily oxidizable, because its oxide is highly conductive and will not create any significant interfacial resistance. On the other hand, materials such as gold are acceptable because they have only a slight tendency to oxidize and are good electrical conductors. Surprisingly, in view of their greater resistance, it has been found that carbon and graphite particles are suitable for present purposes and are capable of performing about as well as silver, although a greater weight percent of carbon must be used. Since carbon is cheaper than the noble metals, and is not affected by oxidation when contacted with such strong oxidizing electrolytes as fluoroboric acid, it is considered to be the preferred material for this invention.

Alternatively, a suitable conductive layer may be applied by electroplating a thin film of a conductive metal, e.g., silver, onto the metal support body. A layer of silver as thin as 0.000010 to 0.000020 inches was found to be adequate. A minimum thickness is preferred for minimum cost.

Any one of a large variety of thermosetting resin systems can be used as a binder for the conductive particle-resin layer. Resins suitable for the present purposes include the polyurethane resins, the silicone resins, the synthetic rubbers and elastomers, such as polybutadiene rubber or polyisobutylene, the polyester resins, which are reaction products of polycarboxylic acids, and polyhydric alcohols, the epoxy resins, such as the reaction products of epichlorohydrin and Bisphenol-A, and the epoxy resins which are flexibilized with polysulfide rubber, polyurethane or polyamide curing agents, such as those which are capable of curing at moderate to room temperatures.

An especially good resin system is the water emulsifiable epoxy resins. In this system, a water emulsifiable epoxy resin, such as Genepoxy 195, a form of the reaction product of epichlorohydrin and Bisphenol-A, is admixed with water and a water-emulsifiable polyamide resin, such as Versamid 265 curing agent. The conductive particles and flakes are then added thereto. The water emulsion technique has the advantage that it permits the addition of a high concentration of conductive particles while maintaining a workable dispersion viscosity.

Alternatively, a solvent system can be employed using compatible solvents admixed with the thermosetting resin system in an amount sufficient to reduce its viscosity to form a thin coating. Whe employing an epoxy resin system, suitable solvents for this purpose include acetone, dimethylformamide, methyl ethyl ketone, methylene chloride, tri- and tetrachloroethylene, and tetrahydrofuran.

Where necessary, catalysts may be included in the resin system to initiate or to increase the rate of cure. The preferred resin system is one in which the resin-curing agent combination is capable of effecting a cure at slightly above room temperature, although room temperature curing systems are also satisfactory.

It is desirable for weight and space problems that the total thickness of the electrode, including all coatings, be less than 0.005 inch and when the conductive material is metal flakes or particles, the resin-conductive material coating is applied by roller coating, spray coating, silk screening, or with a "doctor-blade."

When using carbon or graphite as the conductive material, it is also desirable to first coat the carbon-resin mixture onto the substrate and thereafter sprinkle or spray from a solvent mixture carbon particles or flakes on top of the coating. A pressure roller is then passed over the coating so as to force the carbon into the resin and through to the metal. The temperature of the roller should be about 75° – 80°C. When using these techniques, a coating in the order of magnitude of several tenths of a mil can be obtained.

When loading metallic conductive materials into the resin, it is usually required to incorporate between about 65 – 90 percent by weight of the particles, based on the total resin composition. Below about 65 percent by weight, the number of conductive paths formed through the layer is inadequate and the degree of interfacial resistance becomes unacceptable. Above about 90 percent by weight, the adhesive strength is reduced and costly materials are wasted since conductivity is not further improved.

When using carbon or graphite particles, it is preferred to load the resin with between about 30 and 80 percent of the particles based on the weight of the resin.

Good results are obtainable when the particles or flakes have an average particle size of about 1 micron when using silver particles and between about 20 to 35 milimicrons when using carbon particles.

For best results, the first coating should have a thickness of between about 0.0002 inches and 0.0001 inches. At lesser thicknesses, coverage is incomplete and at greater thicknesses, material is wasted. Minimum thickness will reduce the size of the overall battery package and hence is most desirable.

THE ACTIVE COATING

After the first coating is secured to the base, the second or active material coating can be tenaciously bound thereto. The active material, such as lead dioxide, is mixed, in the form of particles, with an uncured thermosetting resin. Any of the thermosetting resin systems, including solvents, catalysts, and/or curing agents, indicated as being useful for the conductive particle-resin coating, may be used for preparing the lead dioxide-resin coating.

It is believed that the presence of water and its subsequent removal during cure, contributes porosity to the finished item due to the preferential wetting of the lead dioxide particles by the water. The greater porosity allows greater surface area of lead dioxide to come into contact with the electrolyte system. Also, the use of water eliminates the need for exhaust systems to remove harmful solvent vapors from the work area.

The admixture is applied directly to the first coating by roller coating, silk screening, spray coating, or with a doctor blade, as described above. For best results, a coating should have a thickness of between about 0.001 inches and 0.007 inches.

The particle size of the lead dioxide used in this invention should preferably be within the range of 2 to 50 microns. Particles of this size can best be obtained by electrolytically plating lead dioxide onto a substrate such as graphite, removing the substrate, and grinding the lead dioxide to the desired particle size. Both $\alpha$ and $\beta$-lead dioxide can be so prepared. While chemical precipitation can also be used to prepare $\beta$-lead dioxide particles, most commercial techniques of chemical precipitation yield a particle size of less than 1 micron.

The Lead Dioxide Particle Coating

An additional coating of dry lead dioxide particles may be applied to the surface of the active coating in order to reduce the activation time of the battery. The reason for the reduced activation time is that free lead dioxide particles bonded on the surface of the electrode can react faster with the electrolyte than the bound particles in the active layer.

A variety of techniques may be employed for applying the lead dioxide particles to the surface of the active layer. The preferred method is to use electrostatic spray coating of dry $PbO_2$ particles. Other techniques include vibratory dusters and airless spray systems.

Referring now more specifically to the Figures:

FIG. 1 is a schematic of the plural layered composite of the present invention. The metal shim 1 is first coated with a thermosetting resin-conductive particle or flake mixture 2 as described above. The conductive particles 3 form a series of conductive paths 4 through which current can flow from the metal shim to the subsequently applied layer of lead dioxide or other active material.

A second coating 5 of lead dioxide or other active material is then applied to the first coating 2. The second coating can be an admixture of lead dioxide particles 6 in a thermosetting binder.

Finally, a third coating 7 of dry lead dioxide particles is applied to the surface of the active coating 5.

Figure 2:
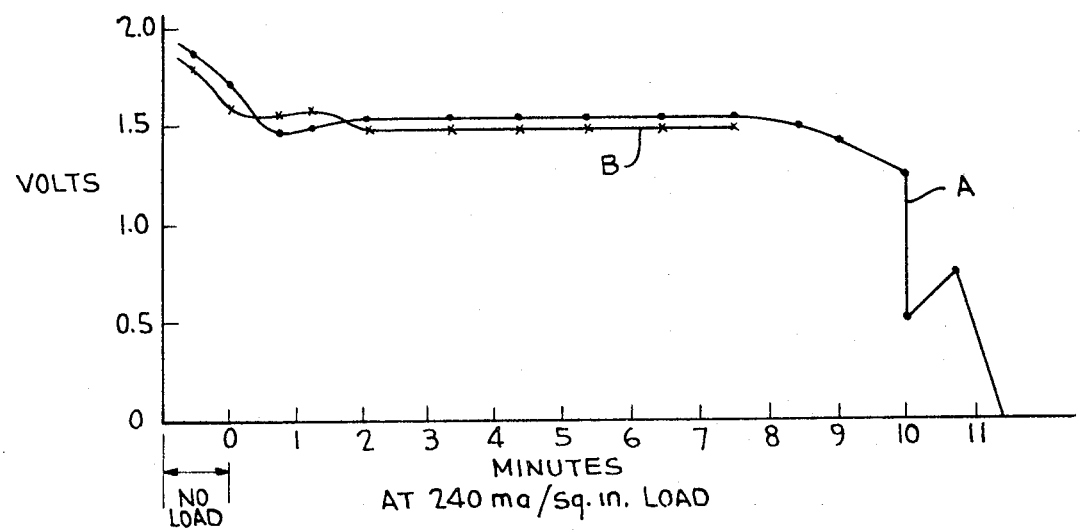
FIG. 2 is a graph showing the relationship of voltage to time when a lead dioxide electrode of this invention is placed under a load of 240 ma/sq. in. in a fluoroboric acid solution together with a free lead electrode.

FIG. 2 will be discussed with reference to the following examples.

Having generally described the invention, a better understanding can be obtained by reference to certain specific examples which are presented herein for purposes of illustration only and are not intended to be limiting in any manner.

EXAMPLE 1

A steel shim of 0.004 inch thickness was degreased by standard solvent techniques. Four parts by weight of epoxy resin (mp. 55° – 68° C, epoxide equivalent 330 – 380) and 96 parts by weight acetone was prepared, to which 0.16 parts by weight 2,4-ethyl methyl imidazole were added. The resin mixture was applied to the shim by pouring the resin over the steel while the steel is held in a vertical position so as to provide a coating about 0.0002 inch thick. Equivalent thicknesses have been obtained by silk screening and by spray coating.

The solvent was removed from the resin by air drying and conductive carbon XC-72 Cabot Corp. in trichlorotrifluoroethane was sprayed onto the dry resin coating. The carbon coating need not be continuous. Alternate methods of coating carbon onto the resin have also been practiced, for instance, softening the resin at 65° C and dusting the carbon onto the resin.

A 20 pound brass roller preheated to about 80° C was then rolled over the carbon so as to force the carbon through the resin until contact is made with the base metal. The resin was then cured and the total thickness of the carbon resin base coat was found to be about 0.0001 inch to 0.0002 inch.

96 parts by weight of 5 micron lead dioxide was prepared. 8 parts by weight of water were weighed into a vessel and 2.0 parts by weight of Genepoxy, a water emulsifiable epoxy resin of epichlorohydrin type, viscosity at 25°C — 6 poises, Epoxide equivalent — 195, were added. 2 parts by weight of polyamide (70 percent non-volatile, viscosity (G-H)—W, Amine Value — 225), Versamid 265 WR 70 were then added. The contents were vigorously mixed until the resins were in intimate contact with each other and emulsified. 6 parts by weight of the emulsion were then added to a vessel containing 48 parts by weight of lead dioxide and thoroughly mixed. This mixture was applied to the carbon-resin base described above by means of a silk screen. Immediately after the lead dioxide top coat was applied, the composite was placed in a 65° to 70° C oven for 2 hours to effect cure. The lead dioxide-resin coating was about 0.007 inch thick. FIG. 2, curve A, shows the electrical properties of the electrode formed according to this example when used in a lead fluoroboric acid-lead dioxide system. When a load of 240 ma/sq. in. was applied, the voltage initially dropped about 0.3 volt from its "no-load" value and then stabilized at about 1.5 volts. No significant decrease in voltage occurred until after about 8 min. of operation.

EXAMPLE 2

The same procedure as that given in Example 1 was followed, except 7.5 parts by weight carbon black was used and was admixed with 1.25 parts by weight of a polyamide curing agent, such as Versamid 140; viscosity —125–175 poises at 25° C, Amine value—370–400, and 1.25 parts by weight Epon 815 epoxy resin, epoxide equivalent 175–195, viscosity — 5–7 poises, and 70 parts by weight dimethylformamide.

The paste so formed was silk screened onto the base. The dimethylformamide was removed with heat and as a result the epoxy binder was partially cured to provide a coating of 0.0002 inches. Roller pressure was applied at this point, but no heat.

A lead dioxide-epoxy coating, as described in Example 1, was then applied to the above carbon black coating.

The output properties of the electrode so formed are shown in FIG. 2, curve B. After the initial 0.3 V drop, when a load of 240 ma/sq. in. was applied, the output of 1.5 volts was maintained for about 6 minutes.

EXAMPLE 3

A silver paste containing 80 parts by weight of silver particles, 10 parts by weight of Genepoxy 195, a water emulsifiable epoxy resin, viscosity at 25° C — 6 poises. Expoxide equivalent — 195, and 10 parts by weight of polyamide — 70 percent non volatile, viscosity (G—H)—W, Amine value — 225, was admixed with 20 parts by weight water. The silver paste was coated onto a 0.0045 inch thick lead-plated steel shim by means of a doctor blade and allowed to air dry to form a layer 0.001 inch to 0.002 inches thick.

A lead dioxide-epoxy resin mixture was prepared by admixing 96 parts by weight lead dioxide (5 microns diameter), 2 parts by weight water emulsifiable resin, 2 parts by weight polyamide curing agent, and 9 parts by weight water. This paste was applied by a doctor blade over the silver base coating so as to obtain a thickness of 0.006 inches. When a current load of 240 ma/sq. in. was applied to the electrode, the voltage dropped about 0.3 volt from its no-load value and then the output of 1.55 volt was maintained for about 8 minutes.

EXAMPLE 4

A steel shim of 0.004 inch thickness was electrolytically flash-plated with silver to a thickness of about 0.00001–0.00002 inch, to produce a conductive surface on the steel support body.

A lead-dioxide-resin mix was prepared by admixing 96.0 parts by weight of $PbO_2$ (average particle size of $5\mu$), 2.4 parts by weight of epoxy resin, epoxide equivalent 185–192, viscosity 100–160 poises at 25°C, 1.6 parts by weight of polyamide resin Versamid 140, amine value 375, viscosity 140 poises at 25°C, and 9.0 parts by weight of tetrachloreothylene. The paste was applied to the silver-flashed steel shim by a doctor blade, to obtain a thickness of about 0.006 inches.

When a current load of 240 ma/sq. in. was applied to the electrode, the voltage dropped about 0.3 volt from its no-load value and them stabilized at about 1.5 volts for about 7 minutes.

EXAMPLE 5

The same procedure as that given in Example 4 was followed to produce electrolytically flashed-plated silver (0.00001–0.00002 inch) on the steel shim (0.004 inch used as the support body.

A $PbO_2$-resin mix was prepared by admixing 96.0 parts by weight of $PbO_2$ (a 60:40 blend of $50\mu$ and $5\mu$ particles), 2.0 pbw of water emulsifiable epoxy resin (epoxide equivalent 200; viscosity, 9 poises at 25°C), 2.0 pbw of water emulsifiable polyamide resin (amine value 175; viscosity, 45 poises at 25°C) and 8.0 pbw of distilled water. The paste was applied to to the silver flashed steel shim by a doctor blade to obtain a thickness of about 0.006 inches.

Immediately thereafter, and with the $PbO_2$-resin-water coating still in the wet state, an excess of dry $PbO_2$ particles (average particle size of $50\mu$) were "dusted" on to the surface by means of a spatula. The panel was then transferred to an oven and cured for 2 hours at 70°C.

When the current load of 240 ma/sq. in/ was applied to the electrode, the voltage dropped about 0.2 volt from its no-load value and then stabilized near 1.5 volts for about 3 minutes.

Activation tests were made at −40°F on dusted and non-dusted controls. The results showed a reduction in activation time to 50 milliseconds, compared to 200 milliseconds for the controls.

Cells prepared using the electrodes of this invention are capable of producing a high output voltage over a relatively extended period of time. Accordingly, these cells are particularly well adapted for use in rockets and missiles where high outputs and cell lives of up to 5–10 minutes are required. In use, the individual cells are combined to provide a battery capable to yielding a specific voltage output requirement. Since the electrodes use comparatively thin coatings, cells and batteries formed with the electrodes of this invention have the added advantage of compactness and high voltage output per volume of cell or battery.

It should be clearly understood that many modifications and changes can be made to the present invention without departing from the spirit or scope. Therefore, the invention should not be limited except by the terms of the attached claims.

What is claimed and intended to be covered by letters patent of the United States is:

1. A bonded electrode which is capable of providing a high voltage output over a relatively extended period of time, which comprises:
   a metallic support body having a coating consisting essentially of a substantially non-corrodible, electrically conductive material selected from the group consisting of metals, carbon and graphite, admixed in a matrix of a cured thermosetting resin, which coating is non-reactive with the battery electrolyte, in an amount sufficient to prevent formation of an inter-facial resistance barrier between the support and the subsequently applied coating of active material, and to prevent corrosive contact of the metal support with the battery acid electrolyte, and wherein said conductive material is present in said thermosetting matrix in an amount sufficient to provide a series of conductive paths through said cured coating,
   and having a second coating thereon of lead dioxide admixed in a cured thermosetting resin so as to present a quantity of active material which is sufficient to react with a suitable electrolyte in an electrolytic cell.

2. The bonded electrode of claim 1, wherein said resin matrix is a polyester, epoxy, silicone, or polyurethane resin.

3. The bonded electrode of claim 1, further comprising a third layer of dry lead oxide particles over said second layer.

4. The bonded electrode of claim 1, wherein said first layer before curing comprises particles of carbon or graphite dispersed in a water emulsifiable epoxy resin matrix.

* * * * *